United States Patent [19]

Sell

[11] Patent Number: 5,945,159

[45] Date of Patent: *Aug. 31, 1999

[54] METHOD FOR ENCAPSULATING VERY FINELY DIVIDED PARTICLES

[75] Inventor: Joseph L. Sell, Beaver Dam, Wis.

[73] Assignee: DCV, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,286

[22] Filed: Dec. 12, 1996

Related U.S. Application Data

[63] Continuation-in-part of application No. 08/764,286, Dec. 11, 1996.

[51] Int. Cl.⁶ ........................................................ B05D 7/00
[52] U.S. Cl. ........................... 427/220; 427/221; 427/421; 118/308
[58] Field of Search ..................................... 427/212, 213, 427/215, 220, 221, 421; 118/308, 417, 418

[56] References Cited

U.S. PATENT DOCUMENTS 3,992,558  11/1976  Smith-Johannsen et al. .......... 427/213
4,162,165   7/1979  Schwab .................................... 427/152
5,306,524   4/1994  Rutz et al. ............................... 427/221

*Primary Examiner*—Shrive Beck
*Assistant Examiner*—Bret Chen

[57] ABSTRACT

The invention is directed to a method for the encapsulation of very finely divided solids within a continuous impervious coating of thermoplastic material. The method is carried out with continuous agitation during which the particles are coated with a plurality of sprayed layers of thermoplastic coating material while maintaining the particles in free-flowing powder consistency during the coating steps.

4 Claims, No Drawings

METHOD FOR ENCAPSULATING VERY FINELY DIVIDED PARTICLES

RELATED APPLICATION

This application is a continuation-in-part of copending U.S. patent application Ser. No. 08/764,286, filed Dec. 11, 1996.

FIELD OF THE INVENTION

The invention is directed to a method for encapsulating very finely divided particles. In particular, the invention is directed to encapsulating such finely divided fine particulate solids which are capable of passing through 200–500 Standard Mesh screens with a continuous impervious coating of thermoplastic material.

BACKGROUND OF THE INVENTION

Particulate solids are usually encapsulated by the simple expedient of mixing the solids with a molten quantity of coating material and then cooling the coated solids while continuing to subject the admixture to agitation. While this simple procedure is normally satisfactory for particles which are larger than about 200 mesh, the procedure is less satisfactory when the solids are very small. In particular, when the particles to be coated are very fine, they tend to agglomerate substantially during the coating operation. Consequently, there is a serious need for a method to coat very fine particles in such manner that they do not undergo agglomeration during the coating operation. As used herein, the term "very fine particles" refers to those which can pass a 200 Standard Mesh screen.

SUMMARY OF THE INVENTION

The invention is directed to a method for encapsulating very fine solid particles comprising:

1. providing finely divided, free-flowing particulate solids which are capable of passing through a 200–500 Standard Mesh screen;

2. while maintaining the temperature of the particulate solids below their softening and decomposition temperatures and below the melting temperature of the thermoplastic coating material, continuously mixing the particles in such manner that the surfaces of the particles are repetitively exposed and in a plurality of steps intermittently spraying onto the exposed surfaces of the finely divided particles a molten thermoplastic material (a) in a total amount sufficient to form a continuous coating thereon (b) at a rate such that the particles remain free-flowing and (c) the temperature of the coated particles and the time interval between spraying cycles being sufficient to effect solidification of the thermoplastic coating material on the particles before any further spraying.

DETAILED DESCRIPTION OF THE INVENTION

A. Finely Divided Solids

The solids, which can be encapsulated by the method of the invention, can be either inorganic or organic so long as they are free flowing in their dry form. It is, of course, essential that the encapsulation operation be carried out below the decomposition temperature of all such materials. Furthermore, in the case of the organic materials, the encapsulation operation must be carried out below the softening temperature of the solids if they are thermoplastic.

Though the invention can advantageously be used for encapsulating coarser solids, it is especially advantageous for more finely divided solids, such as those which are fine enough to pass through a 200 Standard Mesh screen. Furthermore, the invention can be used quite effectively for particles small enough to pass a 500 Standard Mesh screen.

B. Impervious Coating Material

Coating materials suitable for use in the invention must be thermoplastic and must be inert with respect to the underlying encapsulated solids. Petroleum waxes, for example, are frequently used in this method. Hydrogenated vegetable oils such as soybean oil and cottonseed oil are frequently used as well. Other coating materials include mono- and di-glycerides, bees wax, paraffin wax, microcrystalline wax, sunflower seed oil, fats, organic acids, synthetic waxes, hydrogenated castor oil, varnish, resin, lacquers and poly (vinyl alcohol), hydrogenated tallow and animal fats, substituted bees wax, synthetic paraffin wax, hydrogenated cottonseed oil, stearates, glycerol tristearate, crystalline polyethylene, shellacs and poly(ethylene glycol). It will be recognized that when the finely divided solids are to be used in food applications, both the solids and impervious coating material must be safe for human consumption. In the United States, they must comply with appropriate regulations of the U.S. Food & Drug Administration.

It will be recognized by those skilled in the art that one or more additional coatings can be applied to those particles that have first been encapsulated by the above-described method of the invention. In those situations where continuity of such additional coatings is not critical, the additional coating can be applied in a single spraying step. If, however, it is desired to limit the thickness of the subsequent coating and/or to obtain more uniformity of thickness and continuity, the secondary coating can be applied in a plurality of spraying steps, in the manner of the primary thermoplastic coating. Although in most applications the coatings will be applied by spraying only the molten thermoplastic coating material, it will be recognized that solutions of the coating material can be sprayed on in the same manner. In that case, the rate of spraying and interval between spraying steps will need to be adjusted to allow complete evaporation of the solvent.

C. Operating Variables

An important aspect of the invention is that the encapsulation must be carried out in such manner that the final product is of powder consistency and does not contain lumps having paste-like or semi-solid consistency. This goal is attained during the spraying steps by adjusting the rate at which the liquids are applied. Thus, if the admixture incurs lumps or becomes paste-like during spraying of the coating material onto the solids, the admixture can be returned to free-flowing powder consistency by slowing down the rate of liquid addition or by stopping liquid addition for a short time while continuing mixing.

The method of the invention can be readily carried out in conventional mixing equipment that is used for liquid-solids systems. In general, batch mixing equipment such as stationary tank mixers, shear bar mixers, helical blade mixers, and double-arm kneading mixers can be used. Double-arm mixers, such as sigma mixers, have been found to be particularly satisfactory for the practice of the invention. Such mixers provide thorough, uniform, low-shear mixing at a controlled rate of shear, yet blade clearance can, if desired, be adjusted to avoid fracture of the finely divided particles. High-shear mixing should be avoided in the practice of the invention because it causes fracture of the coated particles. Therefore, low-shear mixing is preferred. With the use of such low-shear mixers, blade speeds can be raised or lowered to accommodate different particle sizes. For example, in the use of sigma blade mixers, a blade speed of 20 rpm is more suitable for high density, large particles, but blade speeds of 70 rpm can be used for low density, smaller particles.

Because of the necessity of monitoring the mixing process as described above, it is preferred to employ open top mixers in which the physical state of the material being mixed can be observed visually and periodic additions can be made as needed. In addition, such open top mixers dissipate heat more effectively than closed mixing apparatus.

The spraying steps, in which the thermoplastic coating is applied to the fine particles, are carried out in such manner that the coating is heated above its melting point and sprayed onto the particles in molten form. At the same time, the temperature of the substrate must be maintained below the melting point of the thermoplastic coating in order to get rapid solidification of the coating as it is sprayed on the particles. Thus, the coating material is sprayed onto the particle substrate in a plurality of steps in which a thin continuous coating is applied which is rapidly solidified by contact with the adsorbent before the next coating step.

The careful control of temperatures is important in the effective use of the invention. For example, it is preferred that the temperature of the particles during the spray coating be at least 5 degrees F. below the melting temperature of the molten coating material in order to get rapid solidification of the coating material. However, it is also preferred that the temperature differential between the spray and substrate not exceed 20 degrees F. in order that the coating material not crystallize too rapidly. Too rapid cooling must be avoided because it incurs excessive wetting of the particles, which leads to undesirable agglomeration. In many instances, a temperature differential of 10–15 degrees F. has been optimum. Nevertheless, it is preferred that the temperature of the mixing step be kept low in order to reduce any tendency of the admixture to revert to paste consistency during liquid addition. In general, finer, less dense substrate particles, which have lower heat absorption properties, can be coated at lower temperature without incurring too rapid crystallization of the coating. On the other hand, coarser, more dense substrate particles, which have higher heat absorption properties, should be coated at higher temperatures in order to avoid too rapid crystallization of the coating.

Surprisingly, it has been found that an important variable in carrying out the spraying step is the droplet size of the spray. In particular, if the average droplet size is too large, i.e., above about 750 micrometers, particle aggregation becomes excessive. Particle wetting becomes excessive which, in turn, leads to undesirable agglomeration. On the other hand, if the average droplet size is too small, i.e., below 100 micrometers, there is insufficient penetration of the droplets into the particle mass. An average droplet size of 200–400 micrometers is preferred. In carrying out the spraying step with a given spray nozzle, droplet size is related directly to nozzle pressure.

The thickness of the thermoplastic coating is, of course, a direct function of how much coating material is sprayed onto the substrate. It has been found that the coating material should constitute no more than about 50% of the particle weight in order that the coated particles can be retained in free-flowing form. However, at least 5% by weight coating is needed to assure that the coating is continuous. It is, nevertheless, still further preferred that the amount of coating material constitute 20–40% of the particle weight. In many instances, the optimum amount of coating material has been found to be 25–30% by weight.

In order to assure continuity of the coating of thermoplastic material when applying thin coatings, it is necessary to carry out the initial coating process in at least two steps and preferably three. It has not yet been found to be necessary or advantageous to carry out the coating operation in more than four or five steps.

As mentioned above, the time between spraying steps should be sufficient to effect solidification of the coating material. Typically, each spraying cycle is of 10–15 seconds duration with about five minute intervals between the spraying cycles to facilitate cooling.

By varying the physical characteristics of the coating materials, the invention can be used to encapsulate solid particles in which the contents of the solid particles are released under a wide variety of circumstances. Typically, the relative water solubility of the coating can be used to regulate release time and heat sensitivity of the coating can be used to regulate the temperature at which the substrate material is released. The invention, therefore, finds excessive application in the encapsulation of a wide variety of active materials, such as vitamins, seasonings, minerals and other food-related products, as well as agricultural substances, such as herbicides and pesticides

EXAMPLES

Example 1

In this example, the encapsulation of finely divided particles by conventional procedures is illustrated.

Materials Used

Double-acting baking powder, 250–300 Standard Mesh

Partially hydrogenated cotton seed oil flake, melting point 62 C.

A measured amount of the partially hydrogenated cotton seed oil flake was placed in a Sigma type mixer with the blade speed set at 20 r.p.m. The mixer had a capacity of 8 pounds (3.6 kg). Heat was applied to the mixer to melt the cotton seed oil flake and the temperature was maintained at 67–70 C.

A measured amount of the double-acting baking powder was slowly added continuously to the heated oil and mixing was continued, while maintaining the temperature of the admixture at 67–70 C. When mixing was completed, the admixture, which contained 85% wt. baking powder and 15% oil flake, was in the form of a dough-like emulsion. The admixture was then subjected to a controlled cooling cycle in which it was cooled in 10° C. increments to initiate recrystallization of the cotton seed oil and to return the emulsion to discrete particle form.

It was found that only 30% wt. of the admixture would pass a 20 mesh screen and that 70% of the admixture consisted of agglomerates ranging in size from 3–19 mm. Because of the low yield of finely divided particles therefrom, this method for encapsulation would not be practicable.

Example 2

The following example of the claimed invention illustrates its superiority with respect to the formation of high yields of finely divided encapsulated particles.

Materials Used

Double acting baking powder, 250–300 Standard Mesh

Partially hydrogenated cotton seed oil flake, M.P. 59–62 C.

Recrystallization range 50–55 C.

A measured amount of double acting baking powder was placed in a Sigma blade mixer operating with a blade speed of 70 r.p.m. and heated to 35 C. The mixer had a capacity of 8 pounds (3.6 kg).

A measured amount of partially hydrogenated cotton seed oil flake was then heated to melt it and then cooled and maintained at 56 C. The molten oil was then sprayed onto the baking powder in the Sigma mixer in four separate steps. The temperature of the core material, i.e. the baking powder was 10–40° C. below the melting point of the oil, which facilitated rapid solidification of the oil upon contact with baking powder particles. When the oil-coated product in the Sigma mixer was cooled to 40 C., it was removed from the mixer and classified using a 20 Standard mesh screen. The product contained 85% wt. baking powder and 15% wt. cotton seed oil flake.

Ninety-seven percent by weight of the encapsulated product particles passed a 20 mesh screen. Only 3% wt. of the encapsulated product was agglomerated and thus failed to pass the 20 mesh screen. Thus, the yield of product meeting the particle size criteria by this procedure was 97% wt., as compared with only 30% wt. yield for the prior art procedure described in Example 1.

I claim:

1. A method for encapsulating finely divided particulate solids, which are capable of passing through 200–500 Standard Mesh screens, within a continuous coating of thermoplastic material comprising the sequential steps:

A. placing a quantity of finely divided, free-flowing particulate solids which are capable of passing through 200–500 Standard Mesh screens into a bladed low-shear solids mixing device; and B. while maintaining the temperature of the particulate solids below their softening and decomposition temperatures and below the melting temperature of the thermoplastic coating material, subjecting the particles to continuous low-shear mixing in such manner that the surfaces of the particles are repetitively exposed, and in a plurality of steps intermittently spraying onto the exposed particle surfaces molten droplets of thermoplastic coating material in an amount sufficient to form a continuous coating on the particles, at a rate such that the particles remain free-flowing and the temperature of the coated particles and the time interval between spraying steps is sufficient to effect solidification of the thermoplastic coating material on the particles before further spraying.

2. The method of claim 1 in which the average size of the molten droplets of thermoplastic material is 100–750 micrometers.

3. The method of claim 1 in which the temperature of the particles is 5–20° F. below the temperature of the molten thermoplastic coating material.

4. The method of claim 1 in which the impervious thermoplastic coating comprises 5–10% by weight of the uncoated particles.

* * * * *